United States Patent

[11] 3,633,440

[72] Inventor Gordon D. Corrigan
 Livonia, Mich.
[21] Appl. No. 13,453
[22] Filed Feb. 24, 1970
[45] Patented Jan. 11, 1972
[73] Assignee General Motors Corporation
 Detroit, Mich.

[54] TRANSMISSION CONTROL
 3 Claims, 1 Drawing Fig.

[52] U.S. Cl. .................................................. 74/753,
 74/DIG. 1
[51] Int. Cl. ........................................................ B60k 27/08
[50] Field of Search ............................................ 74/753,
 850, DIG. 1

[56] References Cited
UNITED STATES PATENTS

| | | | |
|---|---|---|---|
| 3,181,394 | 5/1965 | Ramsel et al. ............... | 74/753 |
| 3,389,770 | 6/1968 | Golan et al. ................. | 74/DIG. 1 |
| 3,468,194 | 9/1969 | Horsch et al. ................ | 74/753 |
| 3,527,326 | 9/1970 | Griffen ........................ | 74/753 X |

Primary Examiner—Carlton R. Croyle
Assistant Examiner—Thomas C. Perry
Attorneys—W. E. Finken, A. M. Heiter and R. L. Phillips

ABSTRACT: A transmission control having an interlock valve that operates to prevent delivery of fluid from a manual selector valve to a transmission's fluid pressure operated drive establishing devices unless the manual selector valve has previously selected a transmission condition in which no drive is established.

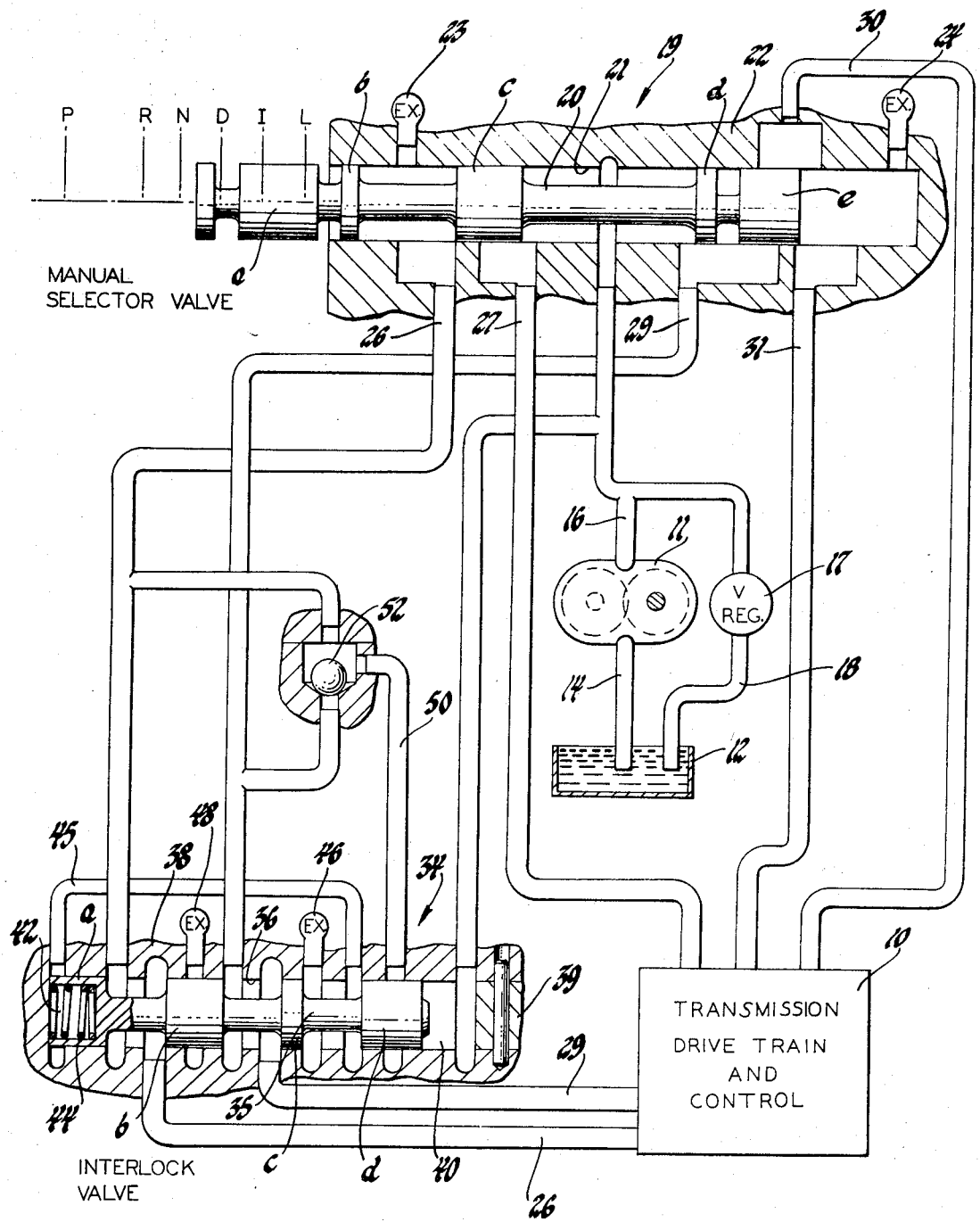

TRANSMISSION CONTROL

This invention relates to transmission controls and more particularly to transmission controls wherein the transmission must first be conditioned so as to transmit no drive prior to the establishment of transmission drive.

It is presently common practice to have an electrical neutral start switch that is actuated by the vehicle's transmission linkage and operates to permit electrical power delivery to the engine's starter only when the transmission's selector level is in either neutral or park and prevents power delivery thereto when the transmission selector is in either a forward or reverse drive establishing position. The present invention is directed to a simple, inexpensive, hydraulic lockout valve arrangement that will provide the same basic operation as a neutral start switch in preventing a drive from being engaged immediately on engine startup and also provides certain other advantages.

The transmission control according to the present invention comprises an interlock valve that is spring biased to a lock position in which it blocks delivery of fluid at main pressure from the transmission's manual selector valve to certain of the transmission's drive establishing devices whose operation is necessary to establish drive while connecting these drive establishing devices to exhaust. The transmission's main pressure is used to continuously bias the interlock valve to an unlock position in which it provides for the normal delivery of fluid from the transmission's manual selector valve to the transmission's drive establishing devices to establish drive. The interlock valve has its spring bias assisted by main pressure whenever the manual selector valve is selecting either a forward or reverse transmission drive and on initial establishment of the main pressure which occurs when the engine is started and running. The spring bias and assisting main pressure bias thus hold the interlock valve in its lock position thus preventing drive establishment when fluid pressure is initially made available in the control system. This lock position is maintained until the manual selector valve is moved to either a neutral or a park position in which event the main pressure assisting the spring bias is relieved to then permit the continuous main pressure bias to move the interlock valve to its unlock position so that the transmission can thereafter be operated in a normal manner. Alternatively, when fluid pressure is first made available on engine starting and the manual selector valve is initially in a position selecting no drive, there is no pressure assist for the spring so that the interlock valve is then immediately moved to and held in its unlock position by the continuous main pressure bias to permit normal transmission operation.

An object of the present invention is to provide in a transmission control a valve which operate to prevent the delivery of fluid from a manual selector valve to a fluid pressure operated drive establishing device upon initial fluid pressure availability until the manual selector valve is first moved to select a transmission condition in which no drive is established.

Another object is to provide in a transmission control an interlock valve that is held in a lock position by a spring bias and an assisting pressure bias to prevent delivery of fluid pressure from a manual selector valve to a fluid pressure operated drive establishing device unless the manual selector valve has previously selected a transmission condition in which no drive is established in which event the assisting pressure bias is relieved to effect fluid delivery for drive establishment by the interlock valve.

These and other objects of the present invention will become more apparent from the following description and drawing which diagrammatically shows the preferred embodiment of the transmission control according to the present invention.

The transmission control according to the present invention is illustrated incorporated in a known automatic transmission arrangement including drive train and control that is generally indicated as 10 and may be of the type disclosed in U.S. Pat. application, Ser. No. 811,439, now U.S. Pat. No. 3,541,887, filed Mar. 28, 1969, by Van Lent et al. and entitled "Transmission and Control". The components of the transmission 10 that will aid in understanding the present invention include a pump 11 that is housed in the transmission's housing and is driven by the vehicle's engine. Thus, the pump 11 which provides the fluid pressure supply for the transmission's control system only operates when the engine is operating. When pump 11 is operating, it draws fluid from a sump 12 through an inlet passage 14 and delivers the fluid under pressure to a passage 16 which is commonly called the transmission control system's main pressure passage. The pressure in main passage 16 is regulated by a conventional regulator valve 17 which operates to bypass excess fluid from main passage 16 to sump 12 via an exhaust passage 18. The main passage 16 is continuously connected to a manual selector valve 19 which is of a conventional design. The manual selector valve 19 is operatively connected to a manual lever (not shown) which permits the vehicle operator to move the manual selector valve's spool valve element 20 to a plurality of positions which are park (P), reverse (R), neutral (N), drive (D), intermediate (I) and low (L). The manual valve element 20 has lands $a$, $b$, $c$, $d$ and $e$ of equal diameter which fit in a bore 21 in the manual selector valve body 22. The bore 21 is ported to exhaust passages 23 and 24 which drain to sump 12 as do all the exhaust passages in the system. The bore 21 is also ported intermediate these exhaust passages to a reverse range delivery passage 26, a reverse-neutral-drive delivery passage 27, the main pressure passage 16, a drive range delivery passage 29, an intermediate range delivery passage 30 and a low range delivery passage 31.

When the manual valve element 20 is positioned for drive range operation as shown, main passage 16 is connected between lands $c$ and $d$ to both the reverse-neutral-drive delivery passage 27 and the drive range delivery passage 29 while the reverse range delivery passage 26 is connected between lands $b$ and $c$ to exhaust passage 23 and both the intermediate range delivery passage 30 and low range delivery passage 31 are connected past the right end of land $e$ to exhaust passage 24. When the manual valve is positioned for intermediate range operation, the drive range delivery passage 29 remains connected to main passage 16, and the main passage 16 is also connected between lands $d$ and $e$ to intermediate range delivery passage 30 while the low range delivery passage 31 remains connected to exhaust passage 24 and the reverse-neutral-drive delivery passage 27 is connected with the reverse range delivery passage 26 between lands $b$ and $c$ to exhaust passage 23. When the manual valve is positioned for low range operation, both the drive range delivery passage 29 and intermediate range delivery passage 30 remain connected to the main passage 16 which is, in addition, then connected between lands $d$ and $e$ to the low range delivery passage 31 which is then blocked by land $e$ from exhaust passage 24 while both the reverse-neutral-drive delivery passage 27 and the reverse range delivery passage 26 remain connected to exhaust passage 23. When the manual valve is positioned for neutral operation, the main passage 16 is connected between lands $c$ and $d$ to the reverse-neutral-drive delivery passage 27 while the reverse range pressure delivery passage 26 is connected to exhaust passage 23 and delivery passages 29, 30 and 31 are all connected to exhaust passage 24. When the manual valve is positioned for reverse range operation, the reverse-neutral-drive delivery passage 27 remains connected to the main passage 16 which is then in addition connected between lands $c$ and $d$ to the reverse range delivery passage 26 while delivery passages 29, 30 and 31 remain connected to exhaust passage 24. When the manual valve is positioned for park, the main passage 16 is blocked at the bore 21 by land $e$ while the delivery passages 26 and 27 are connected to exhaust passage 23 and the delivery passages 29, 30 and 31 are connected to exhaust passage 24.

The fluid delivery passages 26, 27, 29, 30 and 31 are all connected in the transmission 10 as shown schematically to deliver fluid to the remaining portion of the transmission control which includes other drive control devices and the fluid pressure operated motors that engage the transmission's drive establishing devices. For understanding the present invention, it will be sufficient to know that in all of the transmission's forward drives the drive range delivery passage 29 must be supplied with fluid pressure to establish each one of these drives. Furthermore, the reverse range delivery passage 26 must be supplied with fluid pressure to establish the transmission's reverse drive. For a more detailed description of the transmission control thus far described, reference may be made to the previously identified Van Lent et al. patent application.

According to the present invention there is provided an interlock valve 34 which operates on the drive range delivery passage 29 and the reverse range delivery passage 26 to prevent drive establishment in either forward or reverse, until the manual selector valve 19 is first moved to either the neutral or park position. The interlock valve 34 comprises a spool valve element 35 having lands $a$, $b$, $c$ and $d$ of equal diameter which fit in a bore 36 of valve body 38. The right end of bore 36 is closed by a plug 39 to form a chamber 40 that is continuously connected to main passage 16. The other end of bore 36 is closed to provide a chamber 42 in which is located a spring 44 that biases valve element 35 rightward. When valve element 35 is in the position shown which shall be referred to as the unlock position, the drive range delivery passage 29 is connected through the interlock valve 34 between its lands $b$ and $c$ and the reverse range delivery passage 26 is also connected through this valve between its lands $a$ and $b$. In the unlock position, the chamber 42 is connected via a passage 45 and between lands $c$ and $d$ to an exhaust passage 46. When the valve element 35 is moved to its extreme right-hand position which shall be referred to as the lock position, land $b$ blocks the drive range delivery passage 29 at the upstream side and connects this passage on the downstream side between lands $b$ and $c$ to the exhaust passage 46 while the land $a$ blocks the reverse range delivery passage 26 at the upstream side and connects this passage at the downstream side between lands $a$ and $b$ to an exhaust passage 48. In addition, the interlock valve in the lock position connects chamber 42 through passage 45 and between lands $c$ and $d$ to a signal passage 50. Signal passage 50 is connected by a ball check valve 52 to receive fluid from the drive range delivery passage 29 upstream of the interlock valve 34 when fluid is being delivered to the latter passage by the manual selector valve 19. Alternatively, signal passage 50 is connected by check valve 52 to receive fluid from the reverse range delivery passage 26 upstream of the interlock valve 34 when fluid is being delivered to the latter passage by the manual selector 19.

Describing now the operation of the interlock valve 34 in the transmission control, it will be first assumed that the vehicle's engine is stopped and that the manual selector valve 19 is in either its neutral or park position. Since there is no fluid pressure in the transmission control system the interlock valve 34 is normally held in its lock position by spring 44. Then when the vehicle'engine is started, the pump 11 starts delivering fluid pressure to the main passage 16 and thus immediately to chamber 40 of the interlock valve 34. In neutral and also in park, both the drive range delivery passage 29 and the reverse range delivery passage 26 are exhausted and thus there is no fluid pressure made available to chamber 42. This permits the fluid pressure in chamber 40 acting on the end of land $d$ to move the valve element 35 leftward against the bias of spring 44 to condition the interlock valve 34 in its unlock position. Then when fluid pressure is later made available to either the drive range delivery passage 29 or reverse range delivery passage 26, these passages are open to deliver fluid for normal drive establishment. With interlock valve 34 thus conditioned in its unlock positioned, it will thereafter be held in this position for normal transmission drive operation by main pressure from main passage 16 since land $d$ in this valve condition blocks signal line 50 and thus prevents fluid delivery to chamber 42 from the drive range delivery passage 29 during all the forward drives and also from the reverse range delivery passage 26 during the reverse drive.

It will now be assumed that the manual selector valve 19 is in any one of its drive establishing positions which may be either reverse, drive, intermediate or low prior to engine start up. The interlock valve 34 is initially in its lock position, being held there by spring 44. Then when the engine is started, fluid from pump 11 is delivered to chamber 40 as described previously. However, fluid from pump 11 is also immediately delivered via check valve 52, signal passage 50, between lands $c$ and $d$, and passage 45 to chamber 42, this fluid delivery through check valve 52 being from either the drive range delivery passage 29 or reverse range delivery passage 26 since one of these passages is open to the main passage 16 in all of the drive establishing positions of the manual selector valve 19. Since main pressure is thus delivered simultaneously to chambers 40 and 42, the leftward pressure bias on valve element 35 provided by the fluid pressure in chamber 40 is balanced by the rightward bias provided by the fluid pressure now in chamber 42 acting on the end of land $a$ and this permits the spring 44 to continue to yieldingly hold the valve element 35 in its lock position thus preventing drive establishment even though the manual selector valve 19 is then selecting drive establishment.

In order to thereafter establish transmission drive in the forward or reverse direction, it is necessary for the operator to move the manual selector valve 19 to either its neutral or park position. When the operator moves the manual selector valve 19 to either its neutral or park position, the chamber 42 is exhausted of fluid pressure since both the drive range delivery passage 29 and reverse range delivery passage 26 are exhausted in these positions of the manual selector valve. By thus relieving or exhausting the pressure in chamber 42, the pressure in chamber 40 is then effective to move the valve element 35 to its unlock position whereupon when the manual selector valve 19 is then moved to either one of its forward drive establishment positions or its reverse drive establishing position, the land $d$ blocks the signal passage 50 as described previously so that the interlock valve 34 remains held in its unlock position for normal transmission drive operation.

Thus it will be seen that upon initial startup of the vehicle engine and thus of the pump 11, no fluid pressure is made available from the manual selector valve 19 to the fluid pressure operated drive establishing devices in the transmission 10 to establish drive in either the forward or reverse direction until the manual selector valve has first been moved to either the neutral or park position by operation of the interlock valve 34 in its lock position. However, once the interlock valve 34 has been conditioned in its unlock position by the operator selecting a transmission condition in which there is no drive transmittal, it will remain there for normal transmission drive operation.

The above-described preferred embodiment is illustrative of the invention which may be modified within the scope of the appended claims.

I claim:

1. In a transmission control the combination of engine driven fluid pump means; main pressure passage means connected to receive fluid from said fluid pump means; a plurality of fluid delivery passage means including first and second delivery passage means for delivering fluid to establish forward and reverse transmission drives with said first delivery passage means delivering fluid for establishment of all forward drives and said second delivery passage means delivering fluid for establishment of reverse drive; manual selector valve means operable in a plurality of forward drive positions to connect said main pressure passage means to said first delivery passage means, also operable in a reverse drive position to connect said main pressure passage means to said second delivery passage means and also operable in at least one no-drive position to block said main pressure passage means from both said first and second delivery passage means while exhausting said first and second delivery passage means; and interlock valve means operable in a lock position to prevent fluid delivery through both said first and second delivery passage means and also operable in an unlock position to open both said first and said second delivery passage means, said interlock valve means comprising spring means normally holding said interlock valve means in said lock position, first pressure responsive means continuously responsive to the pressure in said main pressure passage means to provide a first pressure bias biasing said interlock valve means to said unlock position, signal passage means, check valve means for alternatively connecting said first and second delivery passage means to said signal passage means, second pressure responsive means operatively connected to said signal passage means only in said lock position for providing a second pressure bias balancing said first pressure bias only in said lock position when fluid is being delivered by said manual selector valve means to either said first or second delivery passage means whereby said interlock valve means is moved by said first pressure bias against the bias of said spring means to said unlock position when said manual selector valve means is in said no-drive position on initial fluid delivery by said fluid pump means and remains held by said first pressure bias in said unlock position when said manual selector valve means is thereafter moved to any of said drive positions and alternatively, said interlock valve means is held in said lock position by the bias of said spring means and said second pressure bias against said first pressure bias when said manual selector valve means is in any one of said drive positions on initial fluid supply by said fluid pump means and said interlock valve means is thereafter moved to said unlock position by said first pressure bias against the bias of said spring means when said second pressure bias is relieved by said manual selector valve means being moved to said no-drive position.

2. The transmission set forth in claim 1 and said interlock valve means including means providing the connection between said signal passage means and said second pressure responsive means in said lock position and disconnecting said second pressure responsive means from said signal passage means in said unlock position.

3. In a transmission control the combination of engine driven fluid pump means; main pressure passage means connected to receive fluid from said fluid pump means; a plurality of fluid delivery passage means including first and second delivery passage means for delivering fluid to establish forward and reverse transmission drives with said first delivery passage means delivering fluid for establishment of all forward drives and said second delivery passage means delivering fluid for establishment of reverse drive; manual selector valve means operable in a plurality of forward drive positions including a drive range position, an intermediate range position and a low range position to connect said main pressure passage means to said first delivery passage means, also operable in a reverse drive position to connect said main pressure passage means to said second delivery passage means and also operable in both a neutral position and a park position to block said main pressure passage means from both said first and second delivery passage means while exhausting said first and second delivery passage means; and interlock valve means operable in a lock position to prevent fluid delivery through both said first and second delivery passage means and also operable in an unlock position to open both said first and second delivery passage means, said interlock valve means comprising spring means normally holding said interlock valve means in said lock position, first pressure responsive means continuously responsive to the pressure in said main pressure passage means to provide a first pressure bias biasing said interlock valve means to said unlock position, signal passage means, check valve means for alternatively connecting said first and second delivery passage means to said signal passage means, second pressure responsive means operatively connected to said signal passage means only in said lock position for providing a second pressure bias balancing said first pressure bias only in said lock position when fluid is being delivered by said manual selector valve means to either said first or second delivery passage means whereby said interlock valve means is moved by said first pressure bias against the bias of said spring means to said unlock position when said manual selector valve means is in either its neutral or park position on initial fluid delivery by said fluid pump means and remains held by said first pressure bias in said unlock position when said manual selector valve means is thereafter moved to any of said drive positions and alternatively, said interlock valve means is held in said lock position by the bias of said spring means and said second pressure bias against said first pressure bias when said manual selector valve means is in any one of said drive positions on initial fluid supply by said fluid pump means and said interlock valve means is thereafter moved to said unlock position by said first pressure bias against the bias of said spring means when said second pressure bias is relieved by said manual selector valve means being moved to either said neutral or park position.

* * * * *